July 18, 1950        C. H. ENDRESS        2,516,048
HEATED BATTERY

Filed Feb. 27, 1946                          2 Sheets-Sheet 1

INVENTOR.
CLARENCE H. ENDRESS
BY
Kwis, Hudson, Boughton & Williams
ATTORNEYS

July 18, 1950 C. H. ENDRESS 2,516,048
HEATED BATTERY
Filed Feb. 27, 1946 2 Sheets-Sheet 2

INVENTOR.
CLARENCE H. ENDRESS
BY
Kwis, Hudson, Boughton & Williams
ATTORNEYS

Patented July 18, 1950

2,516,048

UNITED STATES PATENT OFFICE 2,516,048

HEATED BATTERY

Clarence H. Endress, Cleveland Heights, Ohio, assignor to Willard Storage Battery Company, Cleveland, Ohio, a corporation of West Virginia Application February 27, 1946, Serial No. 650,455

1 Claim. (Cl. 136—161)

The present invention relates to batteries and, more particularly, to storage batteries comprising means for heating the same especially in cold weather.

One of the principal objects of the invention is the provision of a novel and improved battery comprising means, preferably electrically energized, from an auxiliary power source, for heating the same.

Another object of the invention is the provision of a novel and improved storage battery comprising electric means energized from an auxiliary power source for heating the same, which means will be simple in construction and efficient in operation.

Another object of the invention is the provision of a novel and improved storage battery comprising an acid-resistant, electrically energized heating element located in the electrolyte for heating the same, and thermostat means responsive to the temperature of the electrolyte for controlling the supply of energy to the heating element.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which Fig. 1 is a top plan view of a storage battery embodying the present invention;

While the invention is applicable to storage batteries generally and may be variously embodied, a preferred embodiment is herein shown and described in detail, but it is to be understood that the invention is not limited to the particular construction shown.

Figure 1:
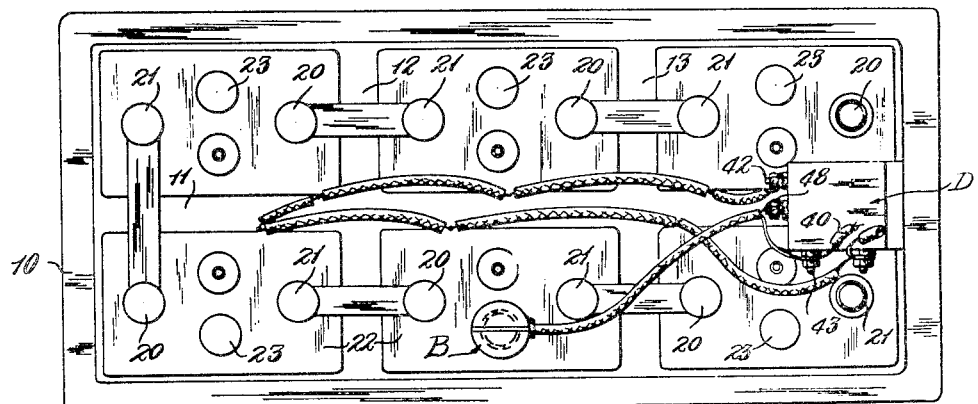
Figure 2:
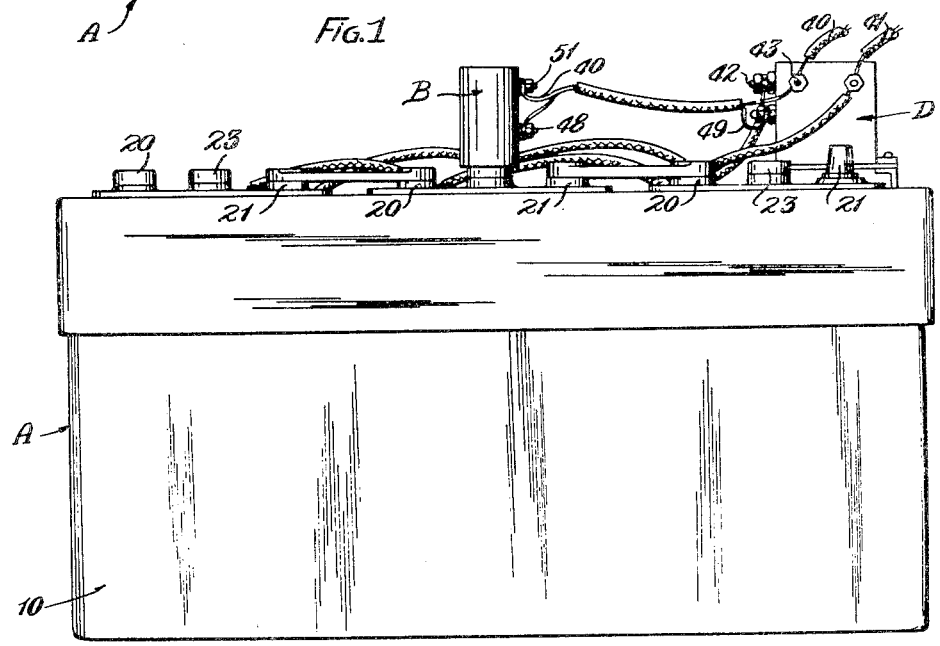
Fig. 2 is a side elevational view of the battery shown in Fig. 1.

Referring to the drawings, the reference character A designates generally a storage battery comprising a case 10 provided with a longitudinal partition 11 and two transverse partitions 12, 13 forming a plurality of suitable chambers for receiving the battery cells of which there are six in the particular battery shown. The cells are all alike and comprise the usual positive and negative plates 14, 15 submerged in electrolyte 16. The plates 14, 15 are separated by insulators 17 and are connected to suitable terminals 20, 21, respectively. Each cell chamber is closed by a cover 22 through which the terminals 20, 21 project. The cell covers 22 are provided with the usual filler openings which are normally closed by a removable plug or cap 23, with the exception of the center cell on the near side of the battery as viewed in Figs. 1 and 2 which, in the present instance, is closed with a thermostat assembly B, hereinafter more specifically referred to. The battery shown is of conventional construction except for the thermostat assembly B, a plurality of heating elements C hereinafter referred to, and the fact that each of the cell chambers is slightly wider than the chambers of commercial batteries of comparable capacity so as to provide room for the heating elements. If desired, a standard size container or case can be used and one of the end negative plates of each cell removed to provide room for the heating elements.

According to the provisions of the present invention, each of the cells of the battery A includes an acid-resistant, electrically-energized heating element C submerged in the electrolyte 16 for heating the same and thermostat means B responsive to the temperature of the electrolyte of the center near cell for controlling the supply of energy to the heating element, which energy is preferably obtained from an auxiliary power source. As shown, the supply of energy to the heating element is controlled by a relay, designated generally as D, but the relay may be dispensed with, if desired, in which event, the supply of energy to the heating element would be controlled directly by the thermostat assembly B.

Figure 3:
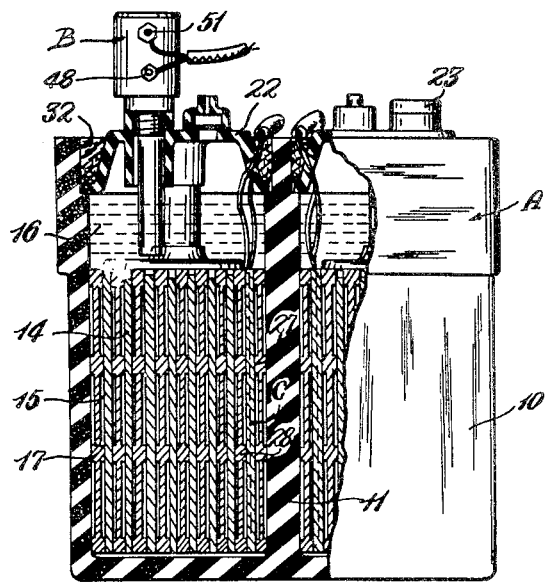
Fig. 3 is an end view of the battery, with portions in section, approximately on the line 3—3 of Figs. 1 and 2.
Figure 4:
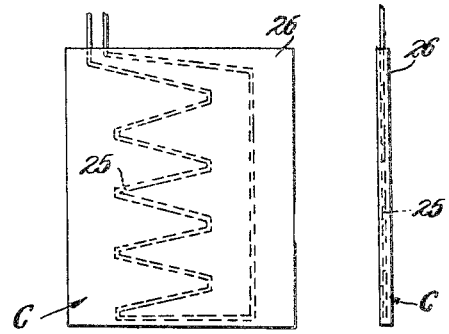
Fig. 4 is a side elevational view of one of the heating elements shown in Fig. 3.
Figure 5:
Fig. 5 is an end view of the heating element shown in Fig. 4.

Referring particularly to Figs. 3, 4 and 5, each of the heating elements C comprises a resistance member or wire 25 embedded in an acid-resistant material 26 preferably polystyrene. Alternatively the resistance member may be sealed between two sheets of mica, etc. The heating elements are approximately the same size as the separators 17 of the battery and are submerged in the electrolyte 16 at the side of the cell adjacent to the central partition 11. The heating elements are spaced from the partition 11 by separators 27 having grooves on the sides adjacent to the heating elements so as to facilitate the flow of electrolyte thereabout. The opposite sides of the heating elements C are separated from the adjacent plates of the battery by separators 28 having grooves on the sides adjacent to the heating elements. The leads of the heating elements are also enclosed within acid-resistant material and pass to the exterior of the cell through small apertures in the cell covers underneath the sealing compound 32.

Figure 6:
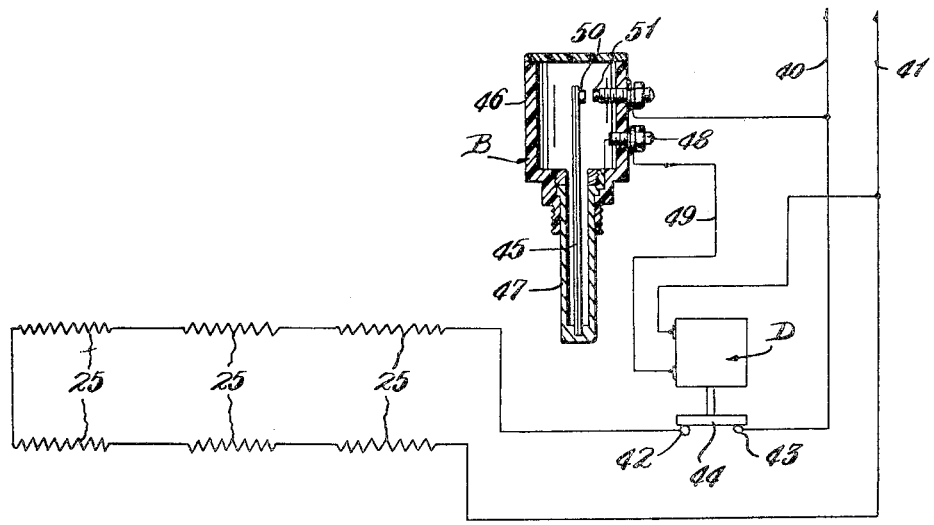
Fig. 6 is a wiring diagram of the electrical circuits.

Referring particularly to Fig. 6, electrical energy is supplied to the six resistance members 25, one of which is located in each of the cells of the battery from an auxiliary power source, not shown, but to which the lead lines 40, 41 are adapted to be detachably connected. The circuit to the resistance members includes normally closed contacts 42, 43 of the relay D adapted to be selectively opened by actuation of a conductor bar 44 upon energization of the solenoid of the relay. The supply of electrical energy to the solenoid of the relay D is controlled by the thermostat assembly B comprising a bimetal member 45 enclosed within an acid-resistant casing 46 preferably made of plastic, the lower end 47 of which is preferably formed of lead or some similar material having high heat conducting properties and normally extends into an electrolyte 16 and forms a heat transfer means between the electrolyte and the bimetal element, the lower end of which is fixed to the part 47 of the casing 46. The part 47 of the casing 46 which is made of lead is connected to a terminal screw 48 which, in turn, is connected by a suitable lead wire 49 to one side of the solenoid of the relay D. The other side of the solenoid of the relay D is connected to the line or wire 41. The upper end of the bimetal member is provided with a contact 50 adapted to engage and disengage a stationary contact 51 adjustably connected to the housing 46 but insulated from the lead part 47. The contact 51 is connected to the line or wire 40. While in the embodiment shown the heating elements C are connected in series circuit, it is to be understood that the elements may be connected in parallel circuit or in a combination series and parallel circuit, as desired, depending upon the voltage of the power supply available etc.

It is believed that the operation of the device will be apparent from the foregoing description thereof. Suffice it to say that when the lines or wires 40, 41 are connected to a suitable source of electric energy, the battery will be heated and maintained at any predetermined temperature for which the thermostat is adjusted, regardless of the temperature outside of the battery. The fact that the heating elements are thin, sheet-like members providing relatively large areas for heat transfer and are submerged within the electrolyte which can circulate thereabout, provides for high efficiency, more rapid heating, and higher temperatures than would be possible if the heating units were otherwise located.

The battery of the present invention is particularly useful as a starting battery for automobiles and other vehicles in cold weather. Shortly before it is desired to operate the vehicle, the lines 40, 41 can be connected to a suitable electric outlet and within a very short time the temperature of the battery will be raised to some predetermined temperature, such as, 60° F. Upon reaching the desired temperature, the contacts of the thermostat assembly B close whereupon the solenoid of the relay D is energized and the power source disconnected. The battery will be maintained at the desired temperature as long as the wires 40, 41 are connected to the electric current supply. The wires 40, 41 can be disconnected from the power source when it is desired to move the vehicle.

From the foregoing, it will be apparent that the objects of the invention heretofore enumerated and others have been accomplished and that there has been provided a novel and improved storage battery, the temperature of which can be quickly raised to and/or maintained at a predetermined temperature. While the preferred embodiment has been described in considerable detail, the invention is not limited to the particular construction shown and it is my intention to hereby cover all adaptations, modifications and uses thereof which come within the practice of those skilled in the art to which the invention relates and within the scope of the appended claim.

Having thus described my invention, I claim:

In a storage battery of the lead-acid type having liquid electrolyte and negative and positive plates submerged therein and alternately arranged and spaced from each other by separators, the combination of an electrically energized heating element composed of a resistance member imbedded in an acid-resistant material, said electrically energized heating element being approximately the size and shape of one of the separators and being submerged in the electrolyte and spaced from one of the plates of the battery by a separator similar to the separators employed to space the plates from each other, and thermostatic means submerged in the electrolyte and responsive to the temperature thereof for controlling the supply of electric energy to said heating element.

CLARENCE H. ENDRESS.

REFERENCES CITED

The following references are of record in the file of this patent:

UNITED STATES PATENTS

| Number | Name | Date |
| --- | --- | --- |
| 1,266,780 | Edison | May 21, 1918 |
| 1,587,425 | Schepp | June 1, 1926 |
| 1,779,946 | Nelson | Oct. 28, 1930 |
| 2,157,139 | Mirick | May 9, 1939 |
| 2,418,792 | Riggs | Apr. 8, 1947 |
| 2,420,577 | Van Lew | May 13, 1947 |

FOREIGN PATENTS

| Number | Country | Date |
| --- | --- | --- |
| 62,194 | Norway | Mar. 18, 1940 |

OTHER REFERENCES

Modern Plastics, February, 1944, page 114.